United States Patent
Chang

(10) Patent No.: US 8,644,379 B2
(45) Date of Patent: Feb. 4, 2014

(54) DE-INTERLACING METHOD AND METHOD OF COMPENSATING A DE-INTERLACED PIXEL

(75) Inventor: Fang-Chen Chang, Hsinhua (TW)

(73) Assignee: Himax Technologies Limited, Tainan County (TW)

( * ) Notice: Subject to any disclaimer, the term of this patent is extended or adjusted under 35 U.S.C. 154(b) by 1717 days.

(21) Appl. No.: 11/683,061

(22) Filed: Mar. 7, 2007

(65) Prior Publication Data

US 2008/0219353 A1   Sep. 11, 2008

(51) Int. Cl.
*H04N 7/12* (2006.01)
*H04N 7/167* (2011.01)

(52) U.S. Cl.
USPC .............. 375/240.1; 375/16; 375/21; 375/26; 380/200; 380/214; 380/222

(58) Field of Classification Search
USPC ................................. 375/240.1; 380/222, 214
See application file for complete search history.

(56) References Cited

U.S. PATENT DOCUMENTS

| | | | | |
|---|---|---|---|---|
| 4,670,772 A | * | 6/1987 | Bolger | 348/450 |
| 4,794,387 A | * | 12/1988 | Sanders, Jr. | 345/12 |
| 4,924,458 A | * | 5/1990 | Obara | 370/360 |
| 5,473,383 A | * | 12/1995 | Sezan et al. | 348/452 |
| 5,691,774 A | * | 11/1997 | Yasuda et al. | 375/240.14 |
| 6,166,772 A | * | 12/2000 | Voltz et al. | 348/448 |
| 6,166,773 A | * | 12/2000 | Greggain et al. | 348/448 |
| 6,609,977 B1 | * | 8/2003 | Shimizu et al. | 463/36 |
| 6,680,732 B2 | * | 1/2004 | Yoo | 345/173 |
| 2002/0080801 A1 | * | 6/2002 | Derks | 370/401 |
| 2005/0008161 A1 | * | 1/2005 | Olsen et al. | 380/276 |
| 2006/0038836 A1 | * | 2/2006 | Abe et al. | 345/690 |
| 2006/0072043 A1 | * | 4/2006 | Ando | 348/792 |
| 2006/0103745 A1 | * | 5/2006 | Nagaishi et al. | 348/294 |
| 2006/0187356 A1 | * | 8/2006 | Ogura | 348/577 |
| 2007/0091997 A1 | * | 4/2007 | Fogg et al. | 375/240.1 |
| 2007/0103588 A1 | * | 5/2007 | MacInnis et al. | 348/448 |
| 2007/0153123 A1 | * | 7/2007 | Pan et al. | 348/452 |
| 2007/0177056 A1 | * | 8/2007 | Zhou et al. | 348/452 |
| 2007/0237238 A1 | * | 10/2007 | Xia et al. | 375/240.24 |
| 2007/0242080 A1 | * | 10/2007 | Hamada et al. | 345/606 |
| 2008/0089404 A1 | * | 4/2008 | Okazaki et al. | 375/240 |
| 2009/0279608 A1 | * | 11/2009 | Jeon et al. | 375/240.16 |
| 2009/0322857 A1 | * | 12/2009 | Jacobs et al. | 348/42 |
| 2011/0184237 A1 | * | 7/2011 | Homan et al. | 600/109 |

FOREIGN PATENT DOCUMENTS

| | | |
|---|---|---|
| TW | 417933 Y | 1/2001 |
| TW | I268703 | 12/2005 |
| TW | 200616446 | 5/2006 |

* cited by examiner

*Primary Examiner* — Edan Orgad
*Assistant Examiner* — Jenise Jackson
(74) *Attorney, Agent, or Firm* — Rabin & Berdo, P.C.

(57) ABSTRACT

A luminance compensating method of compensating a de-interlaced pixel in a current block of a current frame with reference to a reference block of a reference frame is provided. First, calculate an average luminance of the current block and an average luminance of the reference block. Next, adjust the luminance of the de-interlaced pixel by a luminance difference between the average luminance of the current block and the average luminance of the reference block, such that the luminance of the de-interlaced pixel is more appropriate and the display quality is improved.

7 Claims, 3 Drawing Sheets

Calculate an average luminance of a current block and an average luminance of a reference block ── 310

Adjust the luminance of the de-interlaced pixel by an amount being proportional to a luminance difference between the current block and the reference block ── 320

DE-INTERLACING METHOD AND METHOD OF COMPENSATING A DE-INTERLACED PIXEL

BACKGROUND OF THE INVENTION

1. Field of the Invention

The invention relates in general to video processing, and more particularly to a de-interlacing method that compensates a de-interlaced pixel with reference to a luminance difference between a reference block of a reference frame and a current block of a current frame.

2. Description of the Related Art

De-interlacing is the process of converting interlaced video into a non-interlaced form. When displaying an interlaced video on a progressive display, de-interlacing has to be performed.

FIG. 1 shows two de-interlaced frames sequentially obtained using conventional motion compensated de-interlacing. In FIG. 1, all the pixels, e.g. pixel 121, in a current block, e.g. block 126, of a current frame are defined as the pixels, e.g. pixel 111, in the corresponding block, e.g. block 116, of a reference frame, which may also reference the pixels in the corresponding block of another reference frame obtained even earlier. Since half the scan lines, e.g. odd/even scan lines, in these reference frames are interpolated or estimated, a luminance error due to recursive references may propagate.

SUMMARY OF THE INVENTION

It is therefore an object of the invention to provide a de-interlacing method that compensates a de-interlaced pixel with reference to a reference block and a current block.

Moreover, it is an object of the invention to provide a compensating method that uses a luminance difference between the current block and the reference block to adjust the luminance of the de-interlaced pixel.

The invention achieves the above-identified object by providing a de-interlacing method that compensates a de-interlaced pixel in a current block of a current frame. First, a reference block of a reference frame, which is determined to be most matched to the current block, is identified. Next, the luminance of the de-interlaced pixel is determined based on the reference block. Then, the luminance of the de-interlaced pixel is compensated based on the current block and the reference block.

The invention achieves the above-identified object by providing a compensating method that compensates the luminance of a de-interlaced pixel. First, an average luminance of the current block and an average luminance of the reference block are determined. Next, the luminance of the de-interlaced pixel is adjusted according to a luminance difference between the current block and the reference block, such that the luminance of the de-interlaced pixel is more appropriate and the display quality is improved.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
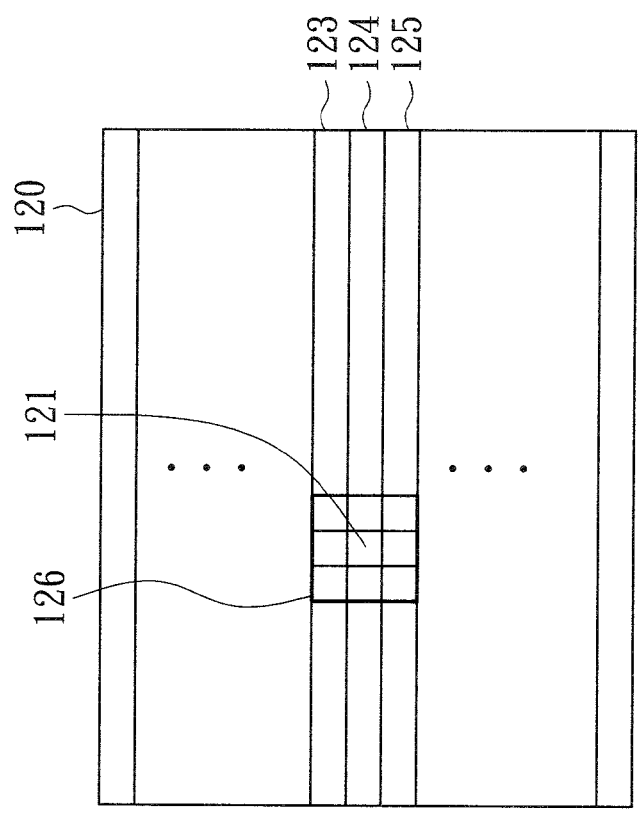
FIG. 1 shows a conventional motion compensated de-interlacing.
Figure 1:
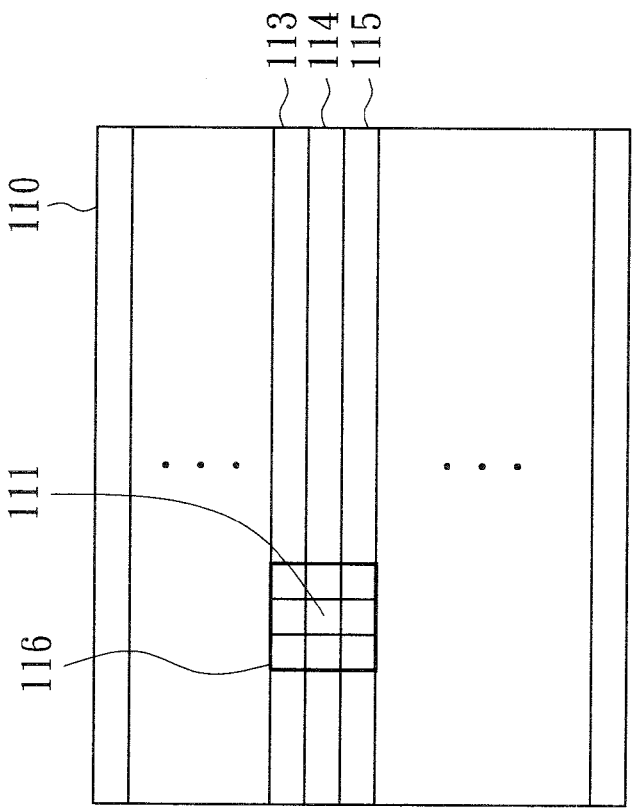
Figure 2:
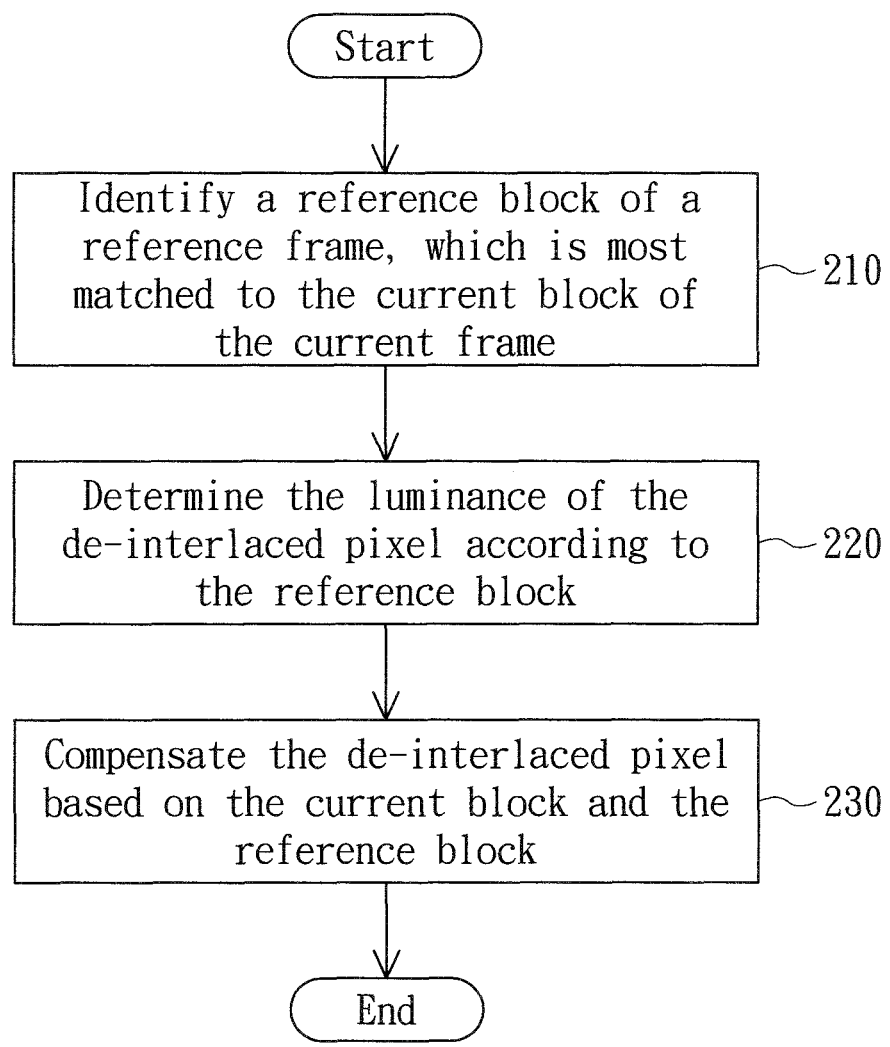
FIG. 2 shows a flowchart of a motion compensated de-interlacing method that compensates a de-interlaced pixel according to an embodiment of the present invention.

FIG. 2 shows a flowchart of a motion-compensated de-interlacing method that compensates a de-interlaced pixel according to an embodiment of the present invention. The de-interlacing method in FIG. 2 is exemplified by pixel 121 in FIG. 1.

In step 210, identify a reference block of the reference frame 110, which is determined to be most matched to the current block 126 of the current frame 120, wherein the pixel 121 is positioned in the current block 126. In this embodiment, the reference block 116 is determined to be the matched block.

Next, in step 220, determined the luminance of the pixel 121 in the current block 126 of the current frame 120 based on the reference block 116 of the reference frame 110. In this embodiment, the pixel 121 corresponds to the reference pixel 111 in the reference block 116 and the luminance of the pixel 121 is determined to be the luminance of the reference pixel 111, such as Ld.

Afterwards, in step 230, compensate the luminance Ld of the pixel 121 with reference to the current block and the reference block, which will be explained in more details below.

Figure 3:
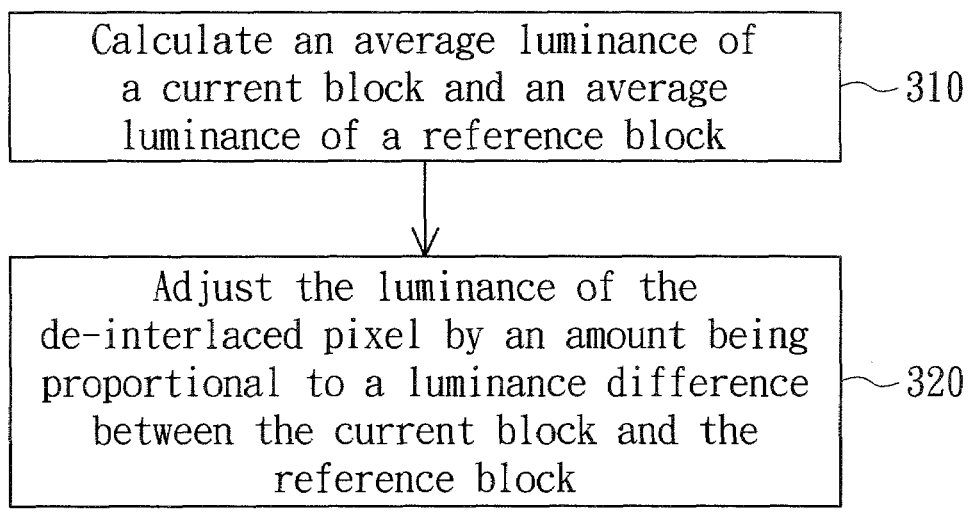
FIG. 3 shows a flowchart of a luminance compensating method that compensates the luminance of a de-interlaced pixel.

FIG. 3 shows a flowchart of a luminance compensating method that compensates the luminance of the pixel 121. In step 310, an average luminance La1 of the current block 126 and an average luminance La2 of the reference block 116 are determined. In the current block 126, the luminance La1 may be determined by averaging the luminance of all the received pixels positioned, e.g. on the scan lines 123 and 125 without other to-be-de-interlaced pixels positioned, e.g. on the scan line 124, while the average luminance La2 of the reference block 116 may be determined by averaging the luminance of all the pixels within the reference block 116.

Next, in step 320, the luminance Ld of the pixel 121 is adjusted with reference to a luminance difference between the current block 126 and the reference block 116, that is, (La1−La2). For example, the luminance of the pixel 121 may be adjusted by an amount being proportional to the luminance difference (La1−La2). In this embodiment, the luminance of the pixel 121 can be adjusted by an amount being equal to the luminance difference (La1−La2). Accordingly, the luminance of the pixel 121 may be determined to be the luminance Ld of the reference pixel 111 plus the difference (La1−La2), that is, Ld+(La1−La2). However, the luminance difference to compensate the pixel 121 can be used differently and not limited thereto.

In this embodiment, the luminance of the pixel 121 in the reference block 126 is determined to be the luminance of the corresponding pixel 111. However, the luminance of the pixel 121 can be also obtained with reference to the reference block 116 in different ways.

In this embodiment, the current block 126 and the reference block 116 are exemplified by 3×3 blocks. However, the de-interlacing method and the compensating method are applicable even when the current block and the reference block are differently sized.

With the present invention, when the current block 126 is generally brighter than the reference block 116, the pixel 121 in the current block 126, which looks dark since the luminance of the pixel 121 is determined to be the luminance of the reference pixel 111 in the reference block 116, may be then adjusted to be brighter based on the luminance difference.

Likewise, when the current block 126 is generally darker than the reference block 116, the pixel 121 in the current block 126, which looks bright since the luminance of the pixel 121 is determined to be the luminance of the reference pixel 111 in the reference block 116, may be then adjusted to be darker based on the luminance difference.

By applying the present method, the luminance of the de-interlaced pixel is compensated and becomes more consistent with the luminance of the neighboring pixels, thus improving the display quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of compensating luminance of a display module for sequentially displaying a reference frame and a current frame of the display module, the method compensating the luminance of a de-interlaced pixel in a current block of the current frame with reference to a reference block of the reference frame, the method comprising the steps of:
    calculating an average luminance of the current block and an average luminance of the reference block; and
    adjusting the luminance of the de-interlaced pixel by an amount that is proportional to a luminance difference between the current block and the reference block;
    wherein the average luminance of the current block is determined by averaging the luminance of all received pixels positioned on odd/even scan lines, excluding other to-be-de-interlaced pixels positioned on even/odd scan lines, in the current block, while the average luminance of the reference block is determined by averaging the luminance of all the pixels in the reference block, and the luminance of the de-interlaced pixel is determined by a reference pixel in the reference block, the reference pixel corresponding to the de-interlaced pixel, plus the luminance difference.

2. The method according to claim 1, wherein the amount is equal to the luminance difference.

3. The method according to claim 1, wherein the current block and the reference block are 3×3 blocks.

4. A de-interlacing method for de-interlacing a pixel in a current block of a current frame for a display module, comprising:
    identifying a reference block of a reference image, which is most matched to the current block of the current frame;
    determining the luminance of a de-interlaced pixel with reference to the reference block; and
    compensating the luminance of the de-interlaced pixel with reference to the current block and the reference block;
    wherein the average luminance of the current block is determined by averaging the luminance of all received pixels positioned on odd/even scan lines, excluding other to-be-de-interlaced pixels positioned on even/odd scan lines, in the current block, while the average luminance of the reference block is determined by averaging the luminance of all the pixels in the reference block, and the luminance of the de-interlaced pixel is determined by a reference pixel in the reference block, the reference pixel corresponding to the de-interlaced pixel, plus the luminance difference.

5. The method according to claim 4, wherein the compensating step further comprises:
    calculating an average luminance of the current block and an average luminance of the reference block; and
    adjusting the luminance of the de-interlaced pixel by an amount being proportional to a luminance difference between the current block and the reference block.

6. The method according to claim 4, wherein the amount is equal to the luminance difference.

7. The method according to claim 4, wherein the current block and the reference block are 3×3 blocks.

* * * * *